US008934659B2

(12) United States Patent
Lemarquand et al.

(10) Patent No.: US 8,934,659 B2
(45) Date of Patent: Jan. 13, 2015

(54) MOVING PART AND ELECTRODYNAMIC TRANSDUCER PROVIDED WITH SUCH A MOVING PART

(75) Inventors: Guy Lemarquand, Le Mans (FR); Benoit Merit, Moutiers les Mauxfaits (FR); Bernard Nemoff, Saint Jean de Luz (FR)

(73) Assignee: Orkidia Audio, Bidart (FR)

( * ) Notice: Subject to any disclaimer, the term of this patent is extended or adjusted under 35 U.S.C. 154(b) by 235 days.

(21) Appl. No.: 13/147,535

(22) PCT Filed: Jan. 27, 2010

(86) PCT No.: PCT/FR2010/050121
§ 371 (c)(1), (2), (4) Date: Aug. 2, 2011

(87) PCT Pub. No.: WO2010/086549
PCT Pub. Date: Aug. 5, 2010

(65) Prior Publication Data

US 2011/0286623 A1 Nov. 24, 2011

(30) Foreign Application Priority Data

Feb. 2, 2009 (FR) ..................................... 09 50645

(51) Int. Cl.
*H04R 1/00* (2006.01)
*H02K 41/035* (2006.01)
*H04R 9/04* (2006.01)

(52) U.S. Cl.
CPC ..................................... *H04R 9/045* (2013.01)
USPC .......................................... 381/409; 381/174

(58) Field of Classification Search
USPC .......................................... 381/400, 409, 174
See application file for complete search history.

(56) References Cited

U.S. PATENT DOCUMENTS

| | | | | |
|---|---|---|---|---|
| 4,582,961 | A * | 4/1986 | Frederiksen | 381/174 |
| 5,647,014 | A * | 7/1997 | Geisenberger | 381/400 |
| 6,587,570 | B1 | 7/2003 | Pavlovic | |
| 2005/0281432 | A1* | 12/2005 | Horigome | 381/412 |

FOREIGN PATENT DOCUMENTS

| | | | |
|---|---|---|---|
| FR | 2 885 277 | A | 11/2006 |
| JP | 2001 359193 | A | 12/2001 |

* cited by examiner

*Primary Examiner* — Duc Nguyen
*Assistant Examiner* — Phan Le
(74) *Attorney, Agent, or Firm* — Andrew W. Chu; Craft Chu PLLC

(57) ABSTRACT

The invention relates to a moving part for an electro-dynamic transducer, including at least one mandrel supporting a winding of at least one coiled wire. The mandrel includes at least one first element rigidly connected inside at least one second element for guiding the moving part inside the transducer. The first element has a winding support for the coiled wire so that the coil is located inside the mandrel, as well as vibration transmitter, such as a diaphragm, the vibration being generated by the movement of the coil induced by the flow of current in the coil wire. The invention also relates to an electro-dynamic transducer including such a moving part.

10 Claims, 1 Drawing Sheet

MOVING PART AND ELECTRODYNAMIC TRANSDUCER PROVIDED WITH SUCH A MOVING PART

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention is related to the electromechanical field.

The invention will find a very particular, but in no way restrictive, application in the field of the electro-dynamic transducers.

These electro-dynamic transducers are generally used as loudspeakers, geophones and microphones.

The present invention relates to a moving part for an electro-dynamic transducer, comprising at least one mandrel supporting a winding of at least one coiled wire.

2. Description of Related Art Including Information Disclosed Under 37 CFR 1.97 and 37 CFR 1.98

In a known way, an electro-dynamic transducer comprises a moving part generally formed of a coil of copper or aluminum wire wound about a mandrel, the latter being made out of a flexible and light material, such as aluminum paper or imide-based polymeric films, such as KAPTON™. Furthermore, within the framework of a loudspeaker, a moving part comprises a diaphragm, commonly referred to as “membrane”, connected to an end of its mandrel. The latter serves as a support for the wire of said coil, is in the form of a cylindrical tube. The unit comprised of a coil and a mandrel is mounted movably in the axial direction of said coil within a space referred to as “gap” through which passes a permanent magnetic field, so that, when a current flows through the wire of the coil, the latter moves within the gap. In other words, this system permits to convert an electric current into mechanical energy, or vice-versa.

It should be noted that said permanent magnetic field is generated by a magnet.

The displacement of the moving part induces vibrations of this diaphragm, generating acoustic waves depending on the current flowing through said coil.

In particular, a moving part oscillates inside a guiding sheath. The latter has a cylindrical shape, surrounding part of said moving part and inside which said magnetic field is generated. The evolution of the technique tends to improve the efficiency and the behavior of the dynamics of such a moving part.

Therefore, the mandrel and the membrane are made out of the lightest and thinnest possible materials and are shaped in compliance therewith. Namely, the mandrel is in the form of a cylinder emptied in its central portion, onto which is peripherally wound the wire of said coil.

The reduction in weight of the mandrel and the diaphragm often results into a reduction of their rigidity; this reduction of the rigidity can result into normal resonating modes in the pass-band of the loudspeaker. Non-linearities result from these normal modes, which affect the frequency response of the electro-dynamic transducer. These non-linearities generate harmonic and non-harmonic sound distortions, which are in particular unpleasant when listening.

In addition, the energy of the normal modes, which is not restituted in acoustics is stored during the excitation of the moving part, then restituted as soon as the excitation stops, leading to a tailing phenomenon, to the detriment of the quality of the sound produced.

In order to improve the efficiency, increasingly lighter, but also more rigid materials are used. For more efficiency against the normal modes, some parts are also thicker, in order to increase their rigidity, and are therefore heavier, in contrast to the previously contemplated solutions for improving the efficiency.

Depending on the guiding used for the displacements of the moving part, the design of the mandrel supporting the coil often gives rise to a long and hollow part, which, on the one hand, produces an extra weight and, on the other hand, possesses normal modes of vibration in the pass-band of the electro-dynamic transducer.

In addition, the high excitation of such a mandrel can cause its deformation, largely altering its lifetime and its capacities.

A known solution is described in JP 2001 359193 relating to a moving part for an electro-dynamic transducer comprising, on the one hand, a diaphragm that constitutes emitting means and, on the other hand, a two-part member constituting the support for the coil. The latter transmits its vibration to the diaphragm through said member, which then acts as a tube for transmitting the vibration of the coil. Because of its shape and its positioning, this tube does not emit any useful acoustic wave, since it “splits” the air during its displacement, but, on the other hand, generates parasitic vibrations and, as a tube connecting the coil to the diaphragm, it possesses modes of vibration that are specific to it. Only the diaphragm causes the air to move within such a part. Thus, the mandrel only serves as a support and does not emit at all. Such a moving part falls into the present technical attempt to control the normal modes of vibration of the support of the coil, without being capable of eliminating them.

Another document, U.S. Pat. No. 6,587,570, describes a similar system with a tube supporting a diaphragm and having parasitic normal modes of vibration.

Another solution is described in U.S. Pat. No. 5,647,014, relating to a moving part comprising a tube that encloses the coil at the periphery within a groove. Said tube does not include any emitting means and serves only as a support for the coil.

Furthermore, from Guy LEMARQUAND’s publication, with the title “Mechanical Properties of Ferrofluids in Loudspeakers”, is known a movable part for an electro-dynamic transducer comprising a mandrel that is in the form of a piston, at the periphery of which is provided for a groove receiving said coiled wire in winding, which then serves as a support for the coil. In addition, said piston slides through ferrofluids within a longitudinal recess that acts as a guide. Said piston emits sound vibrations by moving.

However, such a piston remains heavy to be moved for a reduced travel distance within said recess, thus limiting the emitted vibrations, which are furthermore disturbed by the length of the piston.

Such devices are therefore not fully satisfactory and do not permit to avoid the parasitic vibrations.

SUMMARY OF THE INVENTION

The aim of the invention is to cope with the drawbacks of the state of the art by providing the manufacture of a moving part with reduced dimensions for an electro-dynamic transducer permitting to reduce or eliminate the effect of the normal modes in the pass-band, while ensuring an optimal guiding in the direction according to an axis of displacement.

To this end, the object of the invention is a moving part for an electro-dynamic transducer.

Such a moving part comprises at least one mandrel supporting a winding of at least one coiled wire. In particular, said mandrel comprises at least one first member internally integral with at least one second member for guiding the moving part within said transducer, said first member constituting, on the one hand, a support for a winding of said coiled wire, so that the coil is located inside said mandrel and, on the other hand, means for emitting vibrations, such as a diaphragm, said vibrations being generated by the displacement of the coil induced by the flow of current inside the coiled wire.

Such a mandrel advantageously possesses an emissive surface permitting to directly emit vibrations. The central member also improves the global rigidity of the mandrel, thus permitting to use lighter materials.

When applied within a loudspeaker, such a moving part permits to improve the linearity of such an acoustic device. It also permits to omit a traditional diaphragm in the form of an outer membrane.

In addition, enclosing the coil inside the mandrel permits to transmit the force resulting from the displacement of the coil directly to the mandrel. In particular, the supporting member, which also serves as an emitting surface, oscillates exactly like the coil, which results into an improvement of the linearity of the response.

In other words, the known mandrel, which served as a support for the coil, is now only a member for guiding the moving part according to the invention.

Therefore, the moving part according to the invention possesses normal modes pushed beyond the limits of the pass-band of said electro-dynamic transducer.

In addition, the contact of the coil with the two members forming the mandrel according to the invention improves the heat dissipation of the coil during its excitation, thus limiting its heating-up and therefore contributing to avoiding the phenomena of compression of the sound emitted by the electro-dynamic transducer.

Therefore, the coil transmits its force directly to the first member supporting a winding, which has vibration-emitting characteristics, which, through its oscillations, generates sound waves, namely through its emitting surface. In addition, this member can also serve as a support for the coil, then wrapped inside the guiding member and, hence, inside such a mandrel. The response of the emitting surface is then identical to that of the coil, coming close to a perfect linearity.

The invention also relates to an electro-dynamic transducer comprising such a moving part, namely a transducer such as a loudspeaker.

Further features and advantages of the invention will become clear from the following detailed description of the non-restrictive embodiments of the invention. This description will be better understood when referring to the attached drawings.

DETAILED DESCRIPTION OF THE DRAWINGS

The present invention relates to a moving part 1 as well as to an electro-dynamic transducer provided with such a moving part.

Figure 1:
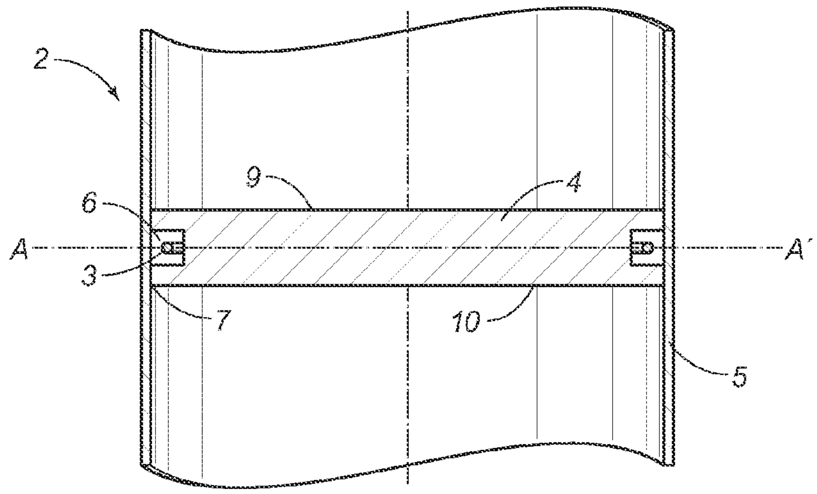
FIG. 1 is a longitudinal cross-sectional view of an embodiment of a moving part according to the invention.

When referring to FIG. 1, such a moving part 1 comprises at least one mandrel 2 supporting a winding of at least one coiled wire 3. In particular, said mandrel 2 is formed of one or several members that can be in the form of a tube, a partially hollow tube, over its full or part of its length or cross-section, or of a bar, namely a cylindrical bar. It is aimed at receiving one or several wires 3 wound so as to form a coil.

Said mandrel 2 comprises at least one first member 4 for winding said coiled wire 3 integral with at least one second member 5 for guiding the moving part 1 within said transducer. In other words, the coil is located inside said mandrel 2, supported by the first member 4 and surrounded by the second member 5.

Advantageously, a feature of the invention consists of making said coil particularly integral with the supporting member 4, so that it transmits its force directly and without intermediacy to said supporting member 4.

Figure 2:
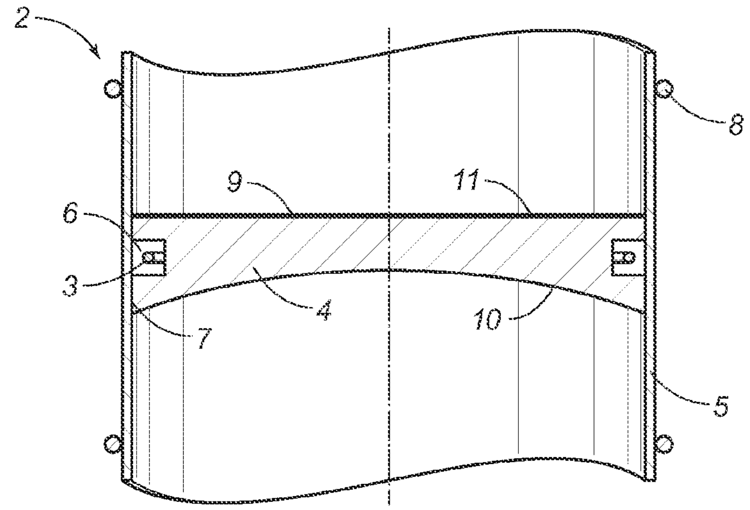
FIG. 2 is a sectional view similar to FIG. 1 according to another embodiment.

Moreover, according to the embodiments visible in FIGS. 1 and 2, said coiled wire 3 can be wound within at least one groove 6. The latter is arranged at the periphery of said first member 4, namely at the level of its peripheral edge 7.

It should be noted that several grooves 6 can extend over the whole or part of the edge 7 of said first member 4 so that they each receive one or several coiled wires 3.

As evoked above, it should be noted that the second member 5 constitutes means for guiding the moving part 1 inside the loudspeaker.

In this respect, said second member 5 can be made out of a rigid and light material, such as carbon fiber or fiberglass.

In addition, according to a non-restrictive embodiment, the guiding of the second member 5 can occur by means of a ferromagnetic liquid for forming ferrofluid seals 8.

Such seals 8 can be seen in FIG. 2 and are arranged fixed at the level of the outer wall of said second member 5. Each seal 8 can then have an annular shape around said second member 5, surrounding the latter.

According to the preferred and essential embodiment, said first member 4 constitutes means for emitting the oscillations generated by the movement of the coil induced by the flow of current inside the coiled wire 3.

By using the surface of said supporting member 4 as an emissive surface wrapped by the guiding member, the thrust does no longer occur by an intermediate part as before, but directly, thus minimizing the losses and frictions. One then observes that the invention permits to push back the normal modes beyond the limits of the pass-band of the electro-dynamic transducer.

In addition, the emissive surface of the supporting member 4 is formed at least partially by a surface extending orthogonally to the axis of the mandrel 2. In other words, this emissive surface moves according to a translation motion parallel to the axis of the loudspeaker. In other words, this emissive surface is at least partially formed by the upper face of said first supporting member 4. Therefore, the latter becomes emissive of sound vibrations, like a diaphragm.

It should be noted that said supporting-emitting member 4 can be made rigid, massive and light, formed of a multilayer complex, such as carbon foam.

According to a preferred embodiment, said first member 4 can be formed of a three-layer complex material, namely comprised of two carbon layers in the center of which extends a film provided with a honeycomb structure. The latter layer can be replaced by any kind of porous material used for designing three-layer material, for example ROHACELL™ foam.

The winding-support and emitting member is thus formed of a massive block, namely a multilayer block, so that it is as rigid as possible, so that its normal frequencies are as high as possible, while remaining as light as possible, in order to improve the efficiency.

Advantageously, said second member 5 is formed of at least one tube. The first member 4 can, in turn, be massive, formed of a bar or a surface for closing the cross-section of the tube of the second member 5.

More in particular, said first member 4 can be formed of a surface close the complete inner cross-section of said second member 5. Moreover, as evoked above, this closing surface can constitute an emission surface, generating acoustic waves.

Figure 3:
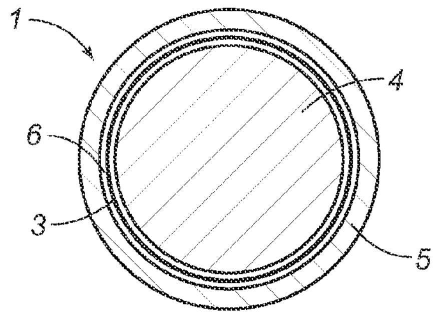
FIG. 3 is an alternate view of FIG. 1 in transversal cross-section according to the axis A-A'.

According to the non-restrictive embodiment, shown in FIG. 3, the first member 4 is internally integral with the second member 5. The first 4 and second 5 members have an identical circular cross-section. The second member 5 is then shaped into a revolution cylinder, while the first member 4 is in the form of a disc. Such a disc can be seen in particular in FIGS. 1 and 2.

As evoked above, said disc and said tube preferably have a cylindrical shape, with a circular base. According to another embodiment, the base of the disc can be polygonal, namely a rectangular parallelepiped, while the base of the tube remains circular. Therefore, said tube has an inner space with a polygonal cross-section for receiving said disc.

In this respect, said tube has a cross-section complementary to the cross-section of said disc, so as to surround said first member 4 and said coiled wire 3 about the first member 4.

It should be noted that the insertion of the disc of the first member 4 inside the tube of the second member 5 permits to considerably increase the rigidity of the latter and, hence, of the unit of the mandrel 2 and the moving part 1, whereby the frequencies of the normal modes increase.

In particular, said disc and said tube are into contact with the coil. The inner surface of the tube thus matches the shape of the supporting-emitting member 4. The first 4 and second 5 members are into contact with the coil so as to ideally lead the heat released by the latter during its excitation, which allows it to maintain a reasonable operating temperature, in order to avoid the phenomena of compression of the sound emitted by the electro-dynamic transducer.

It should be noted that the first 4 and second 5 members can be made integral with each other, at the level of the peripheral edge 7 of said first member 4, through adapted fastening means, namely through gluing. Therefore, the coil is entrapped at the level of said edge 7, namely within the groove 6 of the disc, thus improving the transmission of its movements to the supporting member 4, which then, through the direct transmission of the movement of excitation of the coil, emits vibrations, i.e. becomes an acoustic radiation source, putting air into movement, in order to create the acoustic waves.

The already rigid supporting member 4 is thus positioned in the guiding member 5, the latter alone possessing certainly annoying normal modes. However, its being glued to the supporting member 4 increases its normal frequencies. The unit of the two members 4 and 5 forming the mandrel 2 constitutes a moving part 1 the normal frequencies of which are outside the pass-band of the loudspeaker.

Advantageously, said disc can have at least one of its bases that is flat, convex or concave. According to the various embodiments, the upper base 9 can be designed flat, convex or concave, while the lower base 10 is independently flat, convex or concave. It can also be uniform or have differences in flatness. According to the embodiment shown in FIG. 2, the upper base 9 is flat and the lower base 10 is concave.

As evoked above, these various shapes of the surface of the bases extend substantially in one or several planes orthogonal to the axis of the mandrel 2.

Moreover, in order to reinforce the supporting-emitting member 4 and increase its rigidity, at least one of its bases is treated with a coating material 11. Such a material 11 can be formed of a composite material, namely varnish or a plastic film, even carbon fiber. Depending on the material used, this coating layer 11 at the outer surface of at least one of the bases of said first member 4 can provide an imperviousness to any kind of fluid, namely air. The embodiment of FIG. 2 shows an upper face 9 covered with such a material 11.

The invention also relates to an electro-dynamic transducer, namely such as a loudspeaker, comprising at least one moving part 1 as described above.

An electro-dynamic transducer provided with the moving part according to the invention has the same features as evoked above.

The present invention falls within a context, in which the acoustic waves generated by the moving part 1 can be guided thanks to the frame of the electro-dynamic transducer.

The present invention encloses the coil inside the mandrel 2 permitting to directly transmit to same the force resulting from the displacement of the coil, in particular to the first supporting member of the coil 4.

Advantageously, at least one of such as a diaphragm, transforming the mandrel 2 into a moving part 1, possessing internally a diaphragm. The invention thus permits to omit an outer diaphragm in the form of a membrane. A main aim of the invention is that the response of the emissive surface is as much as possible in agreement with the behavior of the coil.

In addition, the contact of the coil with the two members 4 and 5 forming the mandrel 2 according to the invention improves the heat dissipation of the coil during its excitation, thus limiting its heating-up and, hence, contributing to avoiding the phenomena of compression of the sound emitted by the electro-dynamic transducer.

Finally, the invention provides a better rigidity of the moving part 1, while maintaining the materials as light as possible, which results into increasing the frequencies of the normal modes.

Of course, the invention is not limited to the examples shown and described above, which may have variants and modifications without therefore departing from the framework of the invention, in particular the moving part 1 according to the invention will find an application in any type of device, non-restrictively incorporated into an electro-dynamic transducer, namely such as a loudspeaker, geophone or microphone.

We claim:

1. A moving part for an electro-dynamic transducer, comprising:

a mandrel being comprised of a tube member and a disc member, said tube member and said disc member being made integral, said disc member being housed within an interior of said tube member, said disc member having a support on an outer periphery thereof, wherein a cross section of said tube member is complementary to a cross-section of said disc member, said tube member having an upper portion extending above said disc member and a lower portion extending below said disc member, said disc member being centered between said upper portion and said lower portion, wherein movement of said tube member and disc member corresponds to alignment of said upper portion and said lower portion; and a coiled wire engaging said support on said disc member, said tube member housing said coiled wire and said disc member, said coiled wire being positioned between said tube member and said disc member, wherein movement of said coiled wire corresponds to movement of said tube member and said disc member, said disc member emitting vibrations according to movement of said coiled wire.

2. The moving part, according to claim 1, wherein said disc member has a cylindrical shape with a circular base, said cross section of said disc member being circular, said cross section of said tube member being complementary to circular.

3. The moving part, according to claim 1, wherein said disc member has a polygonal shape with a polygonal base, said cross section of said disc member being polygonal, said cross section of said tube member being complementary to polygonal, said cross section of said tube member being circular.

4. The moving part, according to claim 1, wherein said support on said disc member is comprised of a groove, said groove arranged on a peripheral edge of said disc member.

5. The moving part, according to claim 1, wherein said coiled wire has one side contacting said disc member and one side contacting said tube member.

6. The moving part, according to claim 1, wherein said disc member has a shape with a flat bottom surface.

7. The moving part, according to claim 1, wherein said disc member has a shape with a concave bottom surface.

8. The moving part, according to claim 1, wherein said disc member has a shape with a convex bottom surface.

9. The moving part, according to claim 1, further comprising: a coating on a top surface of said disc member.

10. A transducer system for a loudspeaker comprising:

a mandrel being comprised of a tube member and a disc member, said tube member and said disc member being made integral, said disc member being housed within an interior of said tube member, said disc member having a support on an outer periphery thereof, wherein a cross section of said tube member is complementary to a cross-section of said disc member, said tube member having an upper portion extending above said disc member and a lower portion extending below said disc member, said disc member being centered between said upper portion and said lower portion;

a coiled wire engaging said support on said disc member, said tube member housing said coiled wire and said disc member, said coiled wire being positioned between said tube member and said disc member, wherein movement of said coiled wire corresponds to movement of said upper portion and said lower portion of said tube member and said disc member, said disc member emitting vibrations according to movement of said coiled wire;

a magnet being supported by a frame and magnetically engaged to said coiled wire, wherein current passing through said coiled wire moves said mandrel relative to said magnet, said disc member, wherein said upper portion and said lower portion being aligned with said frame, and wherein said frame guides movement of said tube member and said disc member.

* * * * *